United States Patent [19]

Takahashi et al.

[11] Patent Number: 4,457,619

[45] Date of Patent: Jul. 3, 1984

[54] BACK FOCUS CONTROLLING DEVICE IN OPTICAL SYSTEMS

[75] Inventors: Toshikatsu Takahashi, Kanagawa; Kazuo Yayama, Tokyo, both of Japan

[73] Assignees: Fuji Xerox Co., Ltd.; Tokyo Optical Co., Ltd., both of Tokyo, Japan

[21] Appl. No.: 362,946

[22] Filed: Mar. 29, 1982

[30] Foreign Application Priority Data

Apr. 30, 1981 [JP] Japan .................. 56-65489

[51] Int. Cl.³ .............................. G03B 27/70
[52] U.S. Cl. ...................... 355/60; 355/55; 355/57
[58] Field of Search .............. 355/55, 57, 58, 60; 350/255; 354/195

[56] References Cited

U.S. PATENT DOCUMENTS

| | | | |
|---|---|---|---|
| 975,672 | 11/1910 | Bausch | 350/255 |
| 2,526,433 | 10/1950 | Svensson | 350/255 |
| 3,220,308 | 11/1965 | Lareau | 350/255 |
| 3,696,725 | 10/1972 | Lange | 350/255 |

FOREIGN PATENT DOCUMENTS

| | | | |
|---|---|---|---|
| 496361 | 4/1930 | Fed. Rep. of Germany | 350/255 |
| 1935618 | 2/1971 | Fed. Rep. of Germany | 355/55 |
| 2710691 | 9/1977 | Fed. Rep. of Germany | 350/255 |
| 843346 | 6/1939 | France | 355/58 |

*Primary Examiner*—Monroe H. Hayes
*Attorney, Agent, or Firm*—Sughrue, Mion, Zinn, Macpeak & Seas

[57] ABSTRACT

A lens focus controlling device for an optical system includes a first cylindrical cam having a cam face formed on at least one end thereof, a second cylindrical cam having a cam face on one end thereof slidably disposed in contact with said first cam face over a predetermined range, a lens group secured to said second cylindrical cam, a stop member operatively engageable with said lens group to prevent rotation while allowing reciprocation of said lens group along the optical axis thereof and a drive system for rotating said first cylindrical cam relative to said second cylindrical cam.

10 Claims, 4 Drawing Figures

BACK FOCUS CONTROLLING DEVICE IN OPTICAL SYSTEMS

BACKGROUND OF THE INVENTION

The present invention is directed to a lens back focus controlling device which is used to control the magnification of an optical system in a microfilm copying machine or the like.

Microfilm copying machines for enlarging and copying a picture recorded on a microfilm are old and well known in the art. Most microfilm copying machines are so designed that a copying magnification is selected since the size of the picture recorded on a microfilm is considerably different from the size of the desired copy. In conventional copying machines, different lenses are provided for different magnifications and each lens specifically provided for a selected magnification is set at a predetermined position in the optical system to perform the copying operation. Therefore, as the number of desirable magnifications is increased the number of lenses to be prepared in advance must be increased accordingly. This substantially increases the manufacturing cost of the copying device. Even if a copying device has a large number of lenses, it is still impossible to fine tune or precisely change the set magnification and, accordingly, it is impossible in practice to achieve an enlarged picture of a precise desired size.

In order to overcome the aforementioned difficulties it has been proposed to vary the lens back focus in order to continuously vary the copying magnification. Such a prior art copying machine is shown in FIG. 1 wherein the light from a light source 10 is applied through a condenser lens 12 to an original microfilm copy 11. The light passed through the original microfilm copy 11 then passes through a lens 14 which is freely movable up and down and then is reflected in sequence from four mirrors 15, 16, 17 and 18 onto the surface of a photosensitive drum 19. The photosensitive drum 19 has been charged before an optical image is formed thereon. As the drum 19 is rotated an exposure process and a development process are successively carried out and a toner image is formed on the drum 19. The toner image is transferred onto a belt carried sheet which is conveyed along a path indicated by the dot-dash chain line 41. After being heated and fixed in the unit 42, the sheet is delivered into a discharge tray (not shown) thereby completing the copying operation.

The operator selects a copying magnification for the copying machine. A central processing unit or microcomputer provides instruction signals to move the lens 14 and the movable mirrors 16 and 17 predetermined distances in the directions of the arrows 13 and 44, respectively, according to the copying magnification thus selected. According to the instruction signals a drive mechanism (not shown) is operated to move the lens 14 and the movable mirror 16 and 17 so that the exposure process is carried out with the desired magnification. In the above-described copying machine the distance between the microfilm surface of the original microfilm copy 11 and the surface of the lens 14 must be adjusted precisely to the order of several microns whenever the copying magnification is changed. Therefore, even if a drive mechanism such as a screw engaged with a threaded hole in the mounting frame (not shown) of the lens is turned a predetermined number of revolutions by a pulse motor (not shown) to a position the lens 14, it is still impossible to adjust the distance with the desired precision since the precision of the screw thread is limited and may have some degree of play. Thus, a suitable driving arrangement for the lens 14 in order to achieve a very precise magnification is not available for use with a copying machine which is used to copy microfilms.

SUMMARY OF THE INVENTION

The present invention provides a new and improved lens back focus controlling device which obviates the aforementioned difficulties and can be used at the position where the adjustment of the lens must be carried out with a considerably high degree of accuracy.

The present invention provides a new and improved lens back focus controlling device wherein cam means which are rotatably driven through a reduction gear reciprocate a lens which is non-rotatably disposed in engagement therewith.

The foregoing and other objects, features and advantages of the invention will be apparent from the following more particular description of a preferred embodiment of the invention as illustrated in the accompanying drawings.

DETAILED DESCRIPTION OF THE INVENTION

Figure 2:
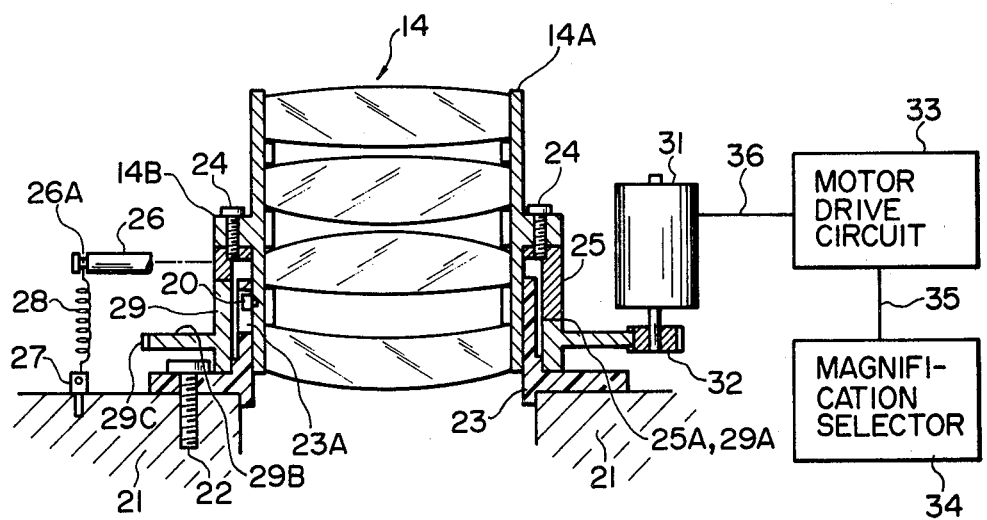
FIG. 2 is a sectional view of a lens back focus controlling device according to the present invention.

The back focus controlling device according to the present invention is shown in FIG. 2 wherein the lens 14 is supported by means of a cylindrical lens support 14A which is arranged in an upright position below a conventional microfilm scanning stand (not shown). The lower end portion of the lens support 14A is fitted precisely into a supporting cylindrical stand 23 which is secured to a lens stand 21 by means of screws 22. A vertically elongated hole 23A is cut into the supporting cylindrical stand 23. The head of a lens rotation stopping pin 20 which is secured to the side of the lens support 14A is loosely inserted into the vertically elongated hole 23A. The lens support 14A has a flange 14B located substantially at the middle level. A cylindrical cam 25 is mounted on the flange 14B by means of screws 24. A plurality of pins 26 are provided at equal intervals on the outer wall of the cylindrical cam 25 in such a manner that they extend horizontally therefrom. Each of the pins 26 has a groove 26A adjacent the end portion thereof and a tension coil spring 28 is connected between each groove 26A and a respective screw 27 which is secured into the lens stand 21 directly beneath each groove 26A. A second cylindrical cam 29 is rotatably supported on the support stand 23 directly below the cylindrical cam 25 in such a manner that the cam surface 25A of the cylindrical cam 25 abuts against the cam surface 29A of the cylindrical cam 29 as a result of the elastic force exerted by the coil springs 28. A circumferentially extending flange 29B protrudes from the outer side wall of the cylindrical cam 29 and is provided with a plurality of gear teeth 29C about the periphery thereof. The gear teeth 29C are engaged with a pinion gear 32 which is directly coupled to the rotary shaft of a stepping motor 31. The stepping motor 31 is coupled to a motor driving circuit 33 which is connected to a magnification setting unit 34.

Figure 1:
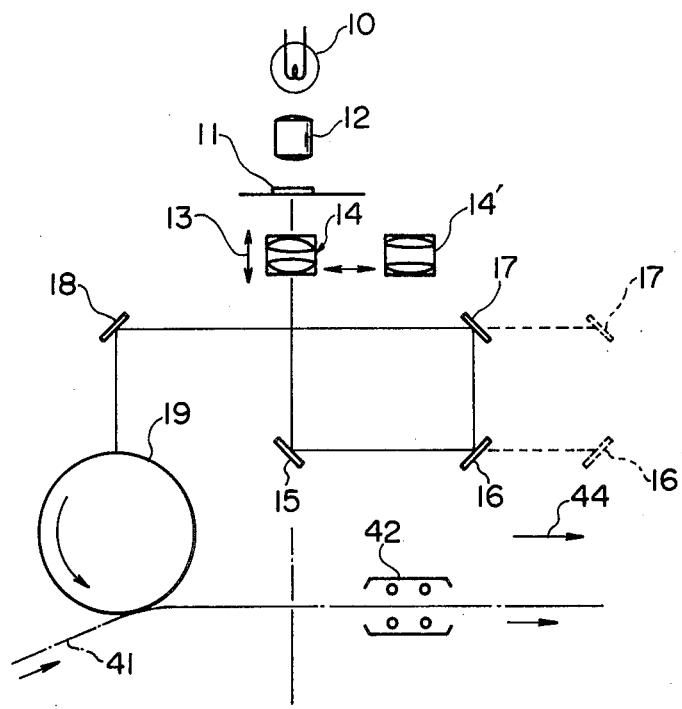
FIG. 1 is a schematic diagram showing the general arrangement of the microfilm copying machine wherein the copying magnification can be continuously varied.

After an original microfilm has been placed upon a suitable stand in alignment with a light source and the focusing lens in the manner shown in FIG. 1, the magnification is selected by the operator in accordance with the arrangement shown in FIG. 2. The magnification setting means 34 may be comprised of a multiple key input unit having a central microprocessor unit incorporated therein which calculates the amount of movement necessary for the lens 14 to move from a previous setting to a new setting in order to achieve the desired degree of magnification. The magnification setting unit 34 supplies a control signal representative of the desired amount of movement through the connector 35 to the motor drive circuit 33. In response to the control signal the pulse motor driving circuit 33 applies a pulse signal having a predetermined number of pulses through the connector 36 to the stepping motor 31. In response to the number of pulses in the pulse signal, the pulse motor 31 turns the pinion gear 32 thereby rotating the cylindrical cam 29 through a predetermined angle to a new setting where it is stopped.

Figure 3:
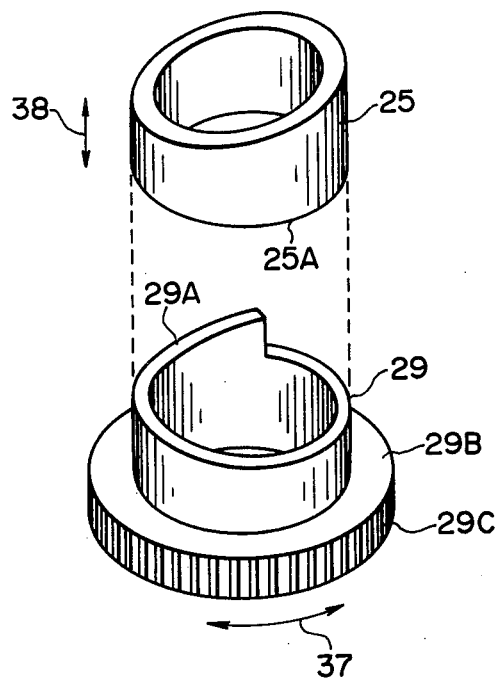
FIG. 3 is a perspective view of the driving and driven cam members which are employed in the device shown in FIG. 2.
Figure 4:
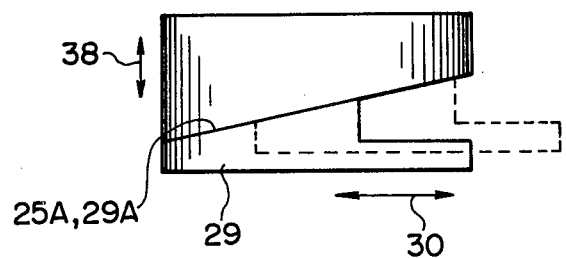
FIG. 4 is a schematic view of the cam elements illustrating the control principle of the present invention.

As the cylindrical cam 29 is rotated in the direction of the arrow 37 as shown in FIG. 3 the cylindrical cam 25 is forced to move vertically in the direction of the arrow 38 due to the location of the rotation stopping pin 20 in the hole 23A and the sliding engagement of the cam surface 25A on the cam surface 29A. At the same time the lens support 14A is moved with the cylindrical cam 25 in the same direction while sliding along the inner wall of the cylindrical support stand 23. Since the cylindrical cam 25 is biased toward the cylindrical cam 29 by the coil springs 28, the cylindrical cam 25 can precisely follow the cylindrical cam 29 regardless of the direction in which the cylindrical cam 29 is rotated. Thus, the angle of rotation of the cylindrical cam 29 can be finally adjusted and precisely set by the gear drive mechanism. Since the outer wall of the lens support 14A is precisely fitted within the inner wall of the cylindrical support stand 23 and the cam surfaces 25A and 29A are in contact with each other continuously through a predetermined range, the tilting of the lens support due to the movement of the lens 14 can be limited to an extremely small value.

As is apparent from the foregoing description, the end faces of the cams are utilized thereby allowing the lens support to be telescopically located within the cams and the back focus is adjusted according to the rotational angle of the cam driven by the motor 31. Thus, the device can be very compact in size.

While a stepping motor 31 has been disclosed as the drive means for the cylindrical cam 29, the stepping motor may be replaced by other driving means such as for instance a servo motor. Furthermore, even though one set of lenses is employed in the illustrated embodiment, it goes without saying that if a magnificationn adjustment is desired over a wide range, a plurality of separate lenses may be employed in such a manner that the magnification setting ranges are assigned to the plural sets of lenses, respectively.

While the invention has been particularly shown and described with reference to a preferred embodiment thereof, it will be understood by those in the art that various changes in form and details may be made therein without departing from the spirit and scope of the invention.

We claim:

1. A lens focus controlling device for an optical system, comprising,
a first cylindrical cam having a cam face formed on at least one end thereof;
a second cylindrical cam having a cam face on one end thereof slidably disposed in contact with said first cam face over a predetermined range;
lens means secured to said second cylindrical cam;
stop means operably engageable with said lens means to prevent rotation while allowing reciprocation of said lens means along the optical axis thereof; and
drive means for rotating said first cylindrical cam relative to said second cylindrical cam, said drive means comprising a stepping motor, electronic control means for controlling said stepping motor, and a circumferentially extending flange formed on an outer wall of one of said first and second cylindrical cams, said flange having a plurality of gear teeth formed on a periphery thereof engageable with a gear rotated by said stepping motor which rotates said at least one of said first and second cylindrical cams.

2. A lens focus controlling device as set forth in claim 1, further comprising spring means normally biasing said second cylindrical cam into engagement with said first cylindrical cam.

3. A lens focus controlling device as set forth in claim 1, wherein said lens means comprises a cylindrical lens support, at least one lens fixedly secured to said lens support, means for securing said lens support to said second cylindrical cam so that said lens support and lens are axially movable with said second cylindrical cam.

4. A lens focus controlling device as set forth in claim 3 further comprising a cylindrical stand, said cylindrical lens support being slidably mounted inside said cylindrical stand.

5. A lens focus controlling device as set forth in claim 4, wherein said securing means comprises at least one screw.

6. A lens focus device as claimed in claim 4, wherein said cylindrical stand includes a vertically elongated hole cut into an inner cylindrical surface thereof, said step means comprising a rotation stopping pin secured to an outer cylindrical surface of said lens support, a head of said pin being loosely inserted into said elongated hole.

7. A lens focus controlling device as set forth in claim 6, further comprising means normally biasing said second cylindrical cam into engagement with said first cylindrical cam.

8. A lens focus controlling device as set forth in claim 7, wherein said spring means comprises a plurality of second pins received in an outer wall of said second cylindrical cam, a plurality of springs, and means for connecting said plurality of springs to said plurality of second pins in a lens stand so as to bias said second pins and said second cylindrical cam toward said first cylindrical cam.

9. A lens focus controlling device as claimed in claim 8, wherein said connecting means comprises grooves formed in said plurality of second pins to which one end of said respective springs are attached, and a plurality of screws attached to said lens stand, opposite ends of said respective plurality of springs being attached to said screws.

10. A lens focus controlling device as set forth in claim 9, wherein said circumferentially extending flange is formed on an outer wall of said second cylindrical cam.

* * * * *